(12) United States Patent
Yamori et al.

(10) Patent No.: US 10,148,966 B2
(45) Date of Patent: *Dec. 4, 2018

(54) VIDEO ENCODING METHOD AND APPARATUS, AND VIDEO DECODING APPARATUS

(71) Applicant: FUJITSU LIMITED, Kawsaki-shi, Kanagawa (JP)

(72) Inventors: Akihiro Yamori, Kawasaki (JP); Kiyoshi Sakai, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 0 days.

This patent is subject to a terminal disclaimer.

(21) Appl. No.: 15/901,273

(22) Filed: Feb. 21, 2018

(65) Prior Publication Data

US 2018/0184094 A1    Jun. 28, 2018

Related U.S. Application Data

(60) Continuation of application No. 14/855,813, filed on Sep. 16, 2015, now Pat. No. 9,906,800, which is a
(Continued)

(51) Int. Cl.
*H04N 19/00* (2014.01)
*H04N 19/14* (2014.01)
(Continued)

(52) U.S. Cl.
CPC ......... *H04N 19/176* (2014.11); *H04N 19/119* (2014.11); *H04N 19/124* (2014.11);
(Continued)

(58) Field of Classification Search
CPC .. H04N 19/176; H04N 19/119; H04N 19/124; H04N 19/136; H04N 19/139;
(Continued)

(56) References Cited

U.S. PATENT DOCUMENTS 5,021,891 A    6/1991 Lee
5,751,359 A    5/1998 Suzuki et al.
(Continued)

FOREIGN PATENT DOCUMENTS

JP    5-506340    9/1993
JP    8-79753    3/1996
(Continued)

OTHER PUBLICATIONS

International Search Report for PCT/JP2007/000263 dated Apr. 24, 2007.
(Continued)

*Primary Examiner* — On S Mung
(74) *Attorney, Agent, or Firm* — Staas & Halsey LLP

(57) ABSTRACT

To allow a finer quantization control according to the property of an image within a macroblock, quantization parameter values are allowed to be changed in units of sub-blocks equal to or smaller than the macroblock in a similar manner as in motion compensation and orthogonal transform processes. A finer-tuned quantization control is performed, for example, by selecting fine and coarse quantization parameters respectively for corresponding sub-blocks if a plurality of images having different properties coexist within the macroblock.

1 Claim, 9 Drawing Sheets

Related U.S. Application Data division of application No. 12/559,978, filed on Sep. 15, 2009, now Pat. No. 9,167,254, which is a continuation of application No. PCT/JP2007/000263, filed on Mar. 20, 2007.

(51) Int. Cl.

| | | |
|---|---|---|
| H04N 19/44 | (2014.01) | |
| H04N 19/51 | (2014.01) | |
| H04N 19/60 | (2014.01) | |
| H04N 19/61 | (2014.01) | |
| H04N 19/119 | (2014.01) | |
| H04N 19/124 | (2014.01) | |
| H04N 19/136 | (2014.01) | |
| H04N 19/139 | (2014.01) | |
| H04N 19/157 | (2014.01) | |
| H04N 19/176 | (2014.01) | |
| H04N 19/547 | (2014.01) | |

(52) U.S. Cl.
CPC ......... *H04N 19/136* (2014.11); *H04N 19/139* (2014.11); *H04N 19/14* (2014.11); *H04N 19/157* (2014.11); *H04N 19/44* (2014.11); *H04N 19/51* (2014.11); *H04N 19/547* (2014.11); *H04N 19/60* (2014.11); *H04N 19/61* (2014.11); *H04N 19/00* (2013.01)

(58) Field of Classification Search
CPC ...... H04N 19/14; H04N 19/157; H04N 19/44; H04N 19/51; H04N 19/547; H04N 19/60; H04N 19/61
USPC .................................................... 375/240.03
See application file for complete search history.

(56) References Cited

U.S. PATENT DOCUMENTS

| | | |
|---|---|---|
| 5,781,238 A | 7/1998 | Kondo et al. |
| 5,786,857 A | 7/1998 | Yamaguchi |
| 7,180,945 B2 | 2/2007 | Furukawa et al. |
| 2003/0012444 A1 | 1/2003 | Inoue et al. |
| 2003/0016878 A1 | 1/2003 | Motosu et al. |
| 2003/0035477 A1 | 2/2003 | Sekiguchi et al. |
| 2004/0234144 A1 | 11/2004 | Sugimoto et al. |
| 2006/0209952 A1 | 9/2006 | Tanizawa et al. |
| 2007/0217508 A1 | 9/2007 | Shimada et al. |
| 2009/0046935 A1 | 2/2009 | Akenine-Moller et al. |
| 2010/0296745 A1 | 11/2010 | Strom et al. |

FOREIGN PATENT DOCUMENTS

| | | |
|---|---|---|
| JP | 8-256341 | 10/1996 |
| JP | 9-102956 | 4/1997 |
| JP | 11-164305 | 6/1999 |
| JP | 2002-369208 | 12/2002 |
| JP | 2005-236584 | 9/2005 |
| JP | 2005-277968 | 10/2005 |
| JP | 2005-318468 | 11/2005 |
| JP | 2006-262004 | 9/2006 |
| JP | 2006-314126 | 11/2006 |
| WO | WO 2006/099229 A1 | 9/2006 |

OTHER PUBLICATIONS

Australian Office Action dated Jul. 1, 2010 in corresponding Australian application No. 2007351295.
Canadian Office Action dated May 1, 2012 issued in corresponding Canadian Patent Application No. 2,681,025.
Japanese Office Action dated Sep. 11, 2012 in corresponding Japanese Patent Application No. 2009-508689.
Japanese Office Action dated Apr. 3, 2012 issued in corresponding Japanese Patent Application No. 2009-508689.
Canadian Office Action dated Feb. 27, 2013 for corresponding Canadian Application No. 2,681,025.
Japanese Office Action dated Jun. 4, 2013 in corresponding Japanese Application No. 2009-508689.
Canadian Office Action dated Jan. 16, 2014 in corresponding Canadian Application No. 2,681,025.
Notice of Allowance dated Jun. 5, 2015 in corresponding U.S. Appl. No. 12/559,978.
Notice of Panel Decision from Pre-Appeal Brief Review dated Apr. 6, 2015 in corresponding U.S. Appl. No. 12/559,978.
Final Office Action dated Nov. 5, 2014 in corresponding U.S. Appl. No. 12/559,978.
Office Action dated Apr. 9, 2014 in corresponding U.S. Appl. No. 12/559,978.
Final Office Action dated Sep. 10, 2013 in corresponding U.S. Appl. No. 12/559,978.
Office Action dated Apr. 24, 2013 in corresponding U.S. Appl. No. 12/559,978.
Final Office Action dated Aug. 27, 2012 in corresponding U.S. Appl. No. 12/559,978.
Office Action dated Feb. 10, 2012 in corresponding U.S. Appl. No. 12/559,978.
Extended European Search Report dated Jul. 19, 2016 in corresponding European Patent Application No. 07736920.5.
Extended European Search Report dated Nov. 17, 2016 in corresponding European Patent Application No. 16173316.7.
Extended European Search Report dated Nov. 17, 2016 in corresponding European Patent Application No. 16173311.8.
Extended European Search Report dated Nov. 17, 2016 in corresponding European Patent Application No. 16173314.2.
Extended European Search Report dated Nov. 17, 2016 in corresponding European Patent Application No. 16173315.9.
European Office Action dated Oct. 6, 2017 in European Patent Application No. 07736920.5.
European Office Action dated Oct. 6, 2017 in European Patent Application No. 16173314.2.
European Office Action dated Oct. 6, 2017 in European Patent Application No. 16173311.8.
European Office Action dated Oct. 6, 2017 in European Patent Application No. 16173316.7.
European Office Action dated Oct. 6, 2017 in European Patent Application No. 13173315.9.
Notice of Allowance dated Aug. 3, 2017 U.S. Appl. No. 14/855,804.
Notice of Allowability dated Sep. 15, 2017 in U.S. Appl. No. 14/855,804.
Supplemental Notice of Allowability dated Nov. 3, 2017 in U.S. Appl. No. 14/855,804.
Office Action dated Jul. 15, 2016 in U.S. Appl. No. 14/855,804.
Final Office Action dated Feb. 10, 2017 in U.S. Appl. No. 14/855,804.
Notice of Allowance dated Jun. 19, 2017 in U.S. Appl. No. 14/855,821.
Office Action dated Jul. 18, 2016 in U.S. Appl. No. 14/855,821.
Final Office Action dated Feb. 3, 2017 in U.S. Appl. No. 14/855,821.
Notice of Allowance dated Oct. 23, 2017 in U.S. Appl. No. 14/855,813.
Notice of Allowability dated Nov. 14, 2017 in U.S. Appl. No. 14/855,813.
Office Action dated Jun. 23, 2016 in U.S. Appl. No. 14/855,813.
Final Office Action dated Jan. 11, 2017 in U.S. Appl. No. 14/855,813.
Office Action dated Jul. 3, 2017 in U.S. Appl. No. 14/855,813.
Notice of Allowance dated Aug. 14, 2017 in U.S. Appl. No. 14/855,810.
Notice of Allowability dated Sep. 21, 2017 in U.S. Appl. No. 14/855,810.
Supplemental Notice of Allowability dated Nov. 8, 2017 in U.S. Appl. No. 14/855,810.
Office Action dated Jun. 24, 2016 in U.S. Appl. No. 14/855,810.
Final Office Action dated Jan. 20, 2017 in U.S. Appl. No. 14/855,810.
Advisory Action dated Jun. 30, 2017 in U.S. Appl. No. 14/855,810.
U.S. Appl. No. 12/559,978 (U.S. Pat. No. 9,167,254), filed Sep. 15, 2009, Akihiro Yamori et al., Fujitsu Limited.

(56) References Cited

OTHER PUBLICATIONS

U.S. Appl. No. 14/855,804 (U.S. Pat. No. 9,838,698), filed Sep. 16, 2015, Akihiro Yamori et al., Fujitsu Limited.
U.S. Appl. No. 14/855,821 (U.S. Pat. No. 9,756,345), filed Sep. 16, 2015, Akihiro Yamori et al., Fujitsu Limited.
U.S. Appl. No. 14/855,813, filed Sep. 16, 2015, Akihiro Yamori et al., Fujitsu Limited.
U.S. Appl. No. 14/855,810 (U.S. Pat. No. 9,838,699), filed Sep. 16, 2015, Akihiro Yamori et al., Fujitsu Limited.

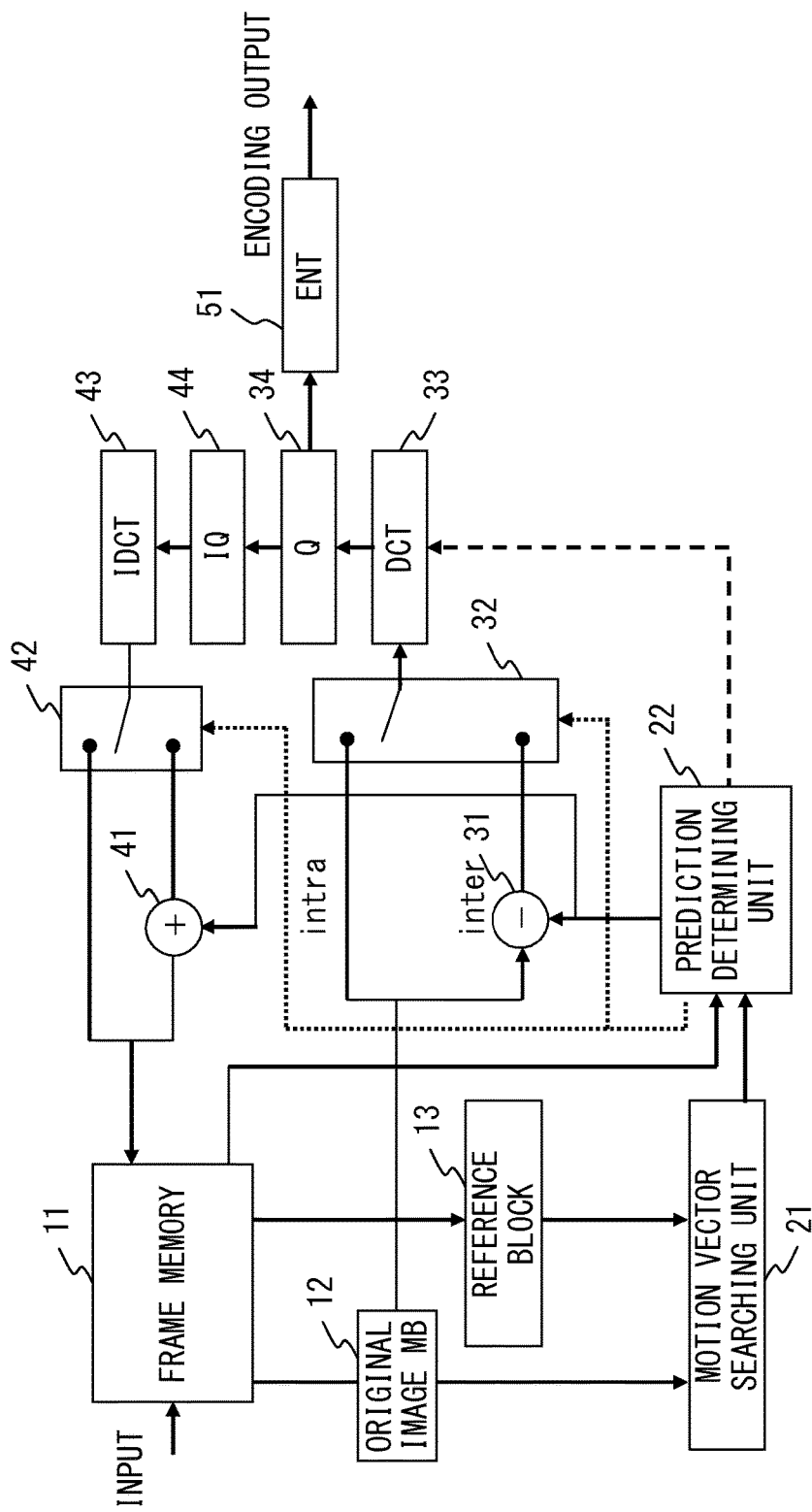
F I G. 1

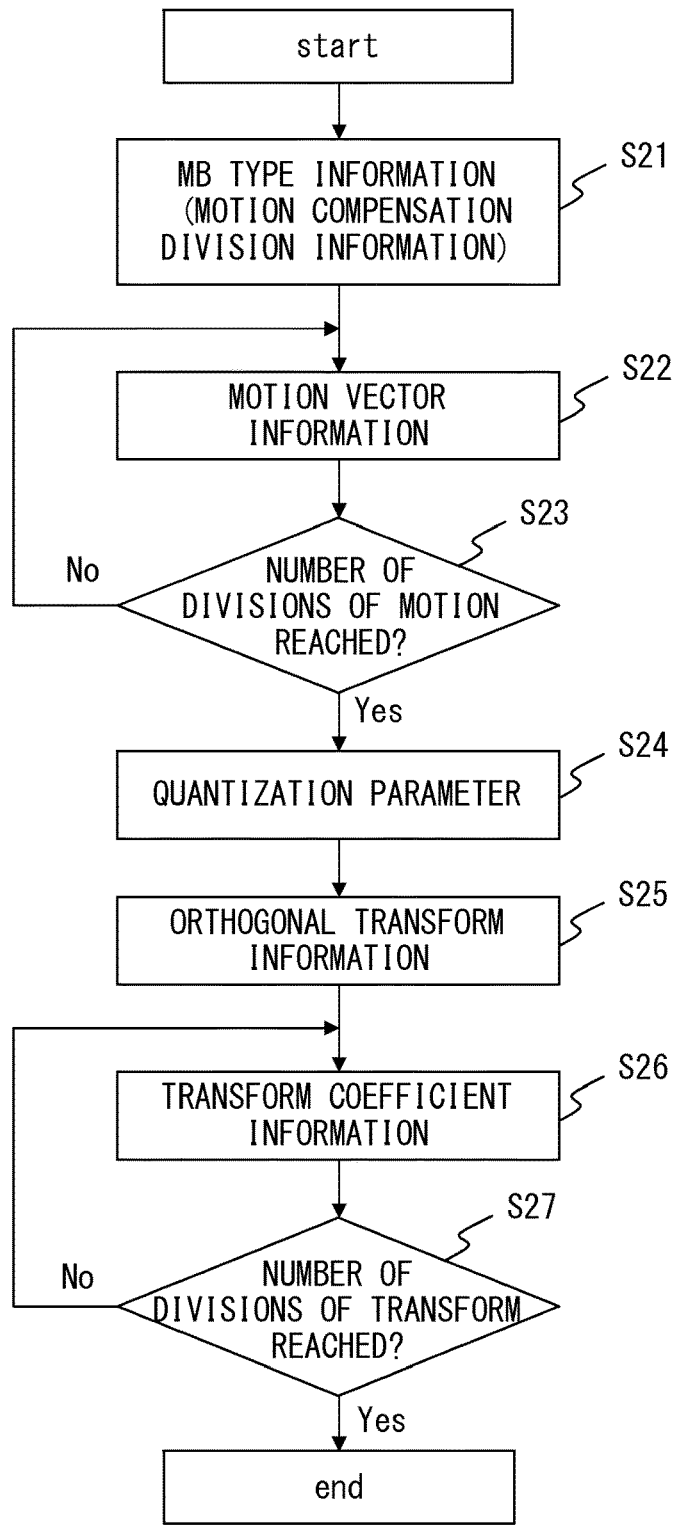
F I G. 2

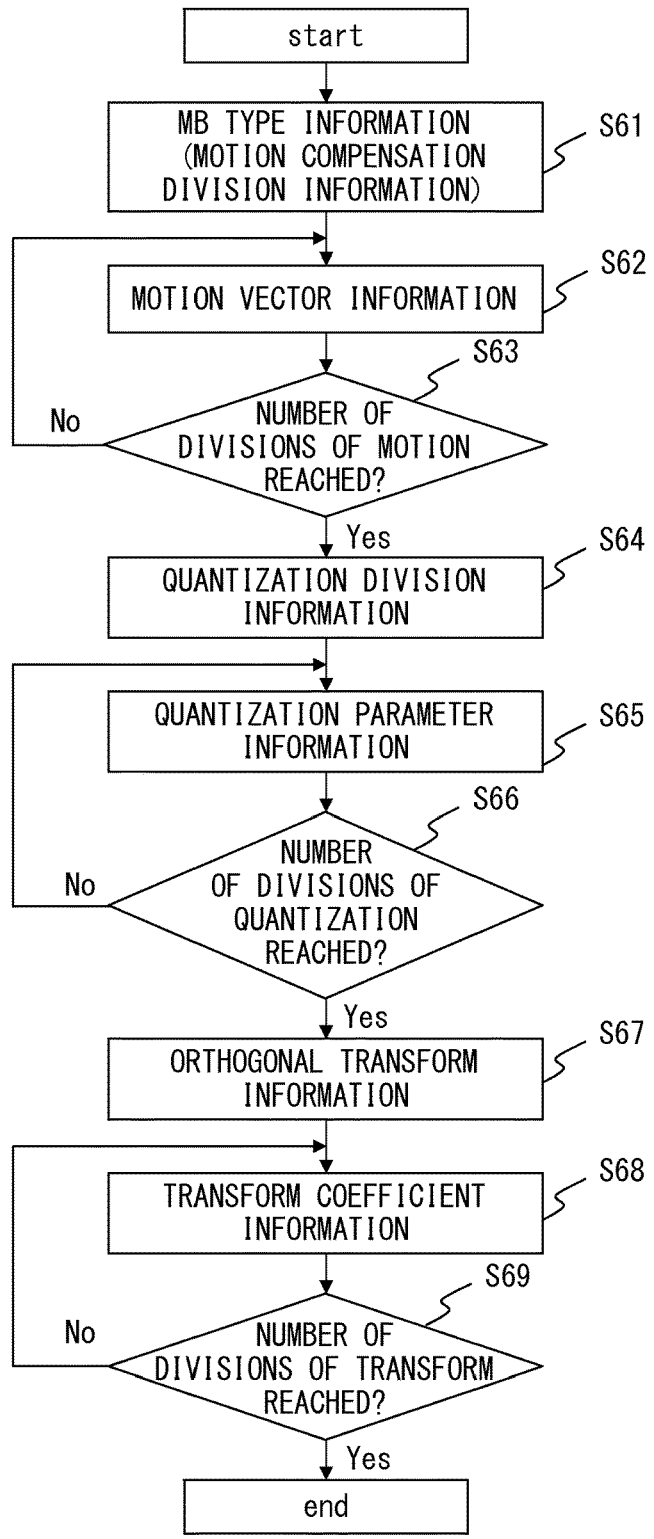
F I G. 6

VIDEO ENCODING METHOD AND APPARATUS, AND VIDEO DECODING APPARATUS

CROSS-REFERENCE TO RELATED APPLICATIONS

This application is a continuation of U.S. patent application Ser. No. 14/855,813, filed Sep. 16, 2015, pending, which is a divisional of U.S. patent application Ser. No. 12/559,978, filed Sep. 15, 2009, now U.S. Pat. No. 9,167,254, which is a continuation application of International PCT Application No. PCT/JP2007/000263, filed Mar. 20, 2007, the disclosures of all of which are incorporated herein by reference.

FIELD

The present invention relates to a technique field of video encoding and video decoding corresponding thereto, and more particularly, to a technique for improving encoding efficiency or visual image quality by allowing the operation unit of a quantization calculation to be more finely controlled.

BACKGROUND

In video encoding methods, an enormous amount of information of an original signal is compressed by omitting redundancies in temporal and spatial directions. Specifically, a technique of motion compensation for taking a difference between preceding and succeeding frames by using a motion vector, and a technique of an orthogonal transform for transforming a plane where pixels are distributed on a screen, namely, in horizontal and vertical directions into frequency components, and a technique of rounding an orthogonal transform coefficient to a representative value with quantization are respectively adopted for temporal and spatial directions. Moreover, variable-length encoding (entropy encoding) is used as a technique of arithmetic information compression.

With conventional video encoding methods adopting, especially, motion vector compensation, encoding is fundamentally performed in processing units of MBs (Macroblocks) of 16×16 pixels. However, encoding in units of blocks of 8×8 pixels is enabled with the encoding methods such as H.263 and MPEG-4. With the latest video encoding of H.264/AVC (Advanced Video Coding), the number of divisions further increases to 16×16, 16×8, 8×16 and 8×8, and blocks of 8×8 pixels are further divided into sub-blocks of 8×8, 8×4, 4×8 and 4×4.

Conventionally, not only in information compression using motion compensation in a temporal direction but also, for example, in an orthogonal transform, DCT (Discrete Cosine Transform) only in units of 8×8 pixels is implemented. However, with H.264/AVC, switching can be made between the processing units of 4×4 and 8×8 for each macroblock although this switching is limited to a profile higher than a high profile.

FIG. 1 is a block diagram illustrating a configuration example of functional blocks of a video encoding apparatus (sometimes referred to as an encoder) for implementing the above described video encoding method.

As illustrated in FIG. 1, the functional blocks of the video encoding apparatus includes a frame memory 11, an original image macroblock buffer 12, a reference block buffer 13, a motion vector searching unit 21, a prediction determining unit 22, a subtractor 31, a first switch 32, an orthogonal transform (DCT) unit 33, a quantization (Q) unit 34, a variable-length encoding (ENT) unit 51, an inverse quantization (Iq) unit 44, an inverse orthogonal transform (IDCT) unit 43, a second switch 42, and an adder 41.

The frame memory 11 stores past and future images in order to make motion estimation.

The original image macroblock buffer 12 stores macroblocks of an original frame to be encoded of each frame stored in the frame memory 11, whereas the reference block buffer 13 stores reference blocks for the macroblocks of the original frame.

The motion vector searching unit 21 searches for a motion vector by using the macroblocks of the original frame and their reference blocks.

The prediction determining unit 22 evaluates motion estimation for all of division shapes of a macroblock illustrated in FIG. 3A to decide a division shape, and determines whether encoding is to be performed either with inter-frame prediction or with intra-frame prediction.

The subtractor 31 calculates a difference between a macroblock and a predicted macroblock.

Switching is made between the first switch 32 and the second switch 42 depending on whether encoding is performed either with inter-frame prediction or with intra-frame prediction.

The orthogonal transform (DCT) unit 33 obtains an orthogonal transform coefficient by performing an orthogonal transform (such as DCT) for image data the information of which is compressed in a temporal direction, and compresses the information in a spatial direction.

The quantization (Q) unit 34 quantizes the orthogonal transform coefficient, and the variable-length encoding (ENT) unit 51 outputs an encoding output by further performing arithmetic compression for the information.

The inverse quantization (IQ) unit 44 obtains an original orthogonal transform coefficient by performing inverse quantization for the quantized orthogonal transform coefficient. The inverse orthogonal transform (IDCT) unit 43 restores data before being orthogonal-transformed from the orthogonal transform coefficient by performing an inverse orthogonal transform.

The adder 41 restores an original image by adding predicted image data to difference data that is the output of the inverse orthogonal transform (IDCT) unit 43 if encoding is performed with inter-frame prediction.

FIG. 2 is a flowchart of a macroblock process executed in the conventional example.

The flow of FIG. 2 illustrates the process according to the order where items of information that are generated by processing a macroblock with the encoder are set and transmitted as encoding information. This order conforms to that laid down as decoding syntax elements in H.264. Table 1 to be provided later is a syntax table of a macroblock layer and its lower-level layers in H.264.

Initially, macroblock type information is set as the initial item of the encoding information in step S21. This information includes information indicating whether encoding is performed either with inter-frame prediction or with intra-frame prediction, and information about the division shape of a macroblock. As the next item of the encoding information, motion vector information is set in step S22. Since the division shape of a macroblock varies depending on the type of the macroblock, the motion vector information is set by the number of divisions as indicated by step S23.

Next, a quantization parameter value is set in the encoding information in step S24. This value is set for each macroblock.

Then, a flag indicating whether an orthogonal transform is performed in units of either 8×8 or 4×4 is set as orthogonal transform information in the encoding information in step S25.

Lastly, in step S26, a coefficient after being orthogonal-transformed in units of 8×8 or 4×4 is obtained, and transform coefficient information obtained by quantizing the coefficient with the quantization parameter set in step S24 is generated and transmitted in units of sub-blocks. This process is repeated by the number of divisions as indicated by step S27. At this time, a flag cbp (coded block pattern) indicating validity/invalidity for each sub-block is set after the motion vector information and before the quantization parameter information within the encoding information. Only the valid coefficient information of a sub-block, which is indicated by the flag, is transmitted.

FIGS. 3A to 3C are explanatory views of conventional macroblock divisions in video encoding. FIG. 3A is an explanatory view of dividing a macroblock in motion estimation. As illustrated in this figure, the macroblock can be divided into 16×16, 16×8, 8×16 and 8×8, and the divided portions of 8×8 can be further divided into 8×4, 4×8 and 4×4.

FIG. 3B is an explanatory view of dividing a macroblock in an orthogonal transform. As illustrated in this figure, the macroblock can be divided into blocks of 8×8 and 4×4.

FIG. 3C illustrates the case of quantization. As illustrated in this figure, quantization is performed in units of 16×16.

The encoding process is further described next with reference to FIGS. 1 and 3A to 3C.

Motion estimations in all of divisions of 16×16, 16×8, 8×16 and 8×8 illustrated in FIG. 3A are evaluated by the prediction determining unit 22 illustrated in FIG. 1, and a prediction mode (macroblock type) is decided by determining the most efficient way of divisions and whichever of inter-frame prediction and intra-frame prediction is to be selected.

Next, the size (orthogonal transform information) of a block to be orthogonal-transformed (DCT) is decided depending on whichever units of 8×8 and 4×4 illustrated in FIG. 3B as the units of the orthogonal transform further reduces the number of prediction errors, and the orthogonal transform (DCT) unit 33 performs the orthogonal transform process.

Then, the quantization (Q) unit 34 rounds a transformed coefficient to a representative value by using a quantization parameter value decided from the viewpoint of distributing the amount of information, and transmits a remaining valid coefficient of non-zero. At this time, the flag cbp indicating whether or not a valid coefficient exists among quantization coefficient values in units of sub-blocks is calculated. Then, the flag cbp, and only the quantization coefficient information of a sub-block having a valid coefficient indicated by the flag cbp are transmitted as encoding information.

Patent Documents 1 to 4 related to video encoding technology are introduced next.

Patent Document 1 particularly refers to the prediction encoding technique used within a screen. Patent Document 2 particularly refers to the division of a macroblock with an arbitrary line segment. Patent Document 3 particularly refers to the technique of quick re-encoding when an encoding method is converted. Patent Document 4 refers to the technique of performing an orthogonal trans form by again dividing into small blocks.

However, none of the documents refer to quantization performed by dividing a macroblock.

Patent Document 1: Japanese Laid-open Patent Publication No. 2005-318468
Patent Document 2: Japanese Laid-open Patent Publication No. 2005-277968
Patent Document 3: Japanese Laid-open Patent Publication No. 2005-236584
Patent Document 4: Japanese Laid-open Patent Publication No. H8-79753

SUMMARY

As described above, encoding using motion compensation or an orthogonal transform is performed by dividing a macroblock into small blocks. However, quantization is still performed with one parameter for each macroblock under the present circumstances. Actually, for quantization control, there is a subjective assessment evaluation improvement technique using, for example, fine and coarse quantization parameters respectively for low and high activities in adaptive quantization. However, the quantization process is executed with one parameter for each macroblock. Therefore, even if both fine and coarse images are included within a macroblock, fine and coarse control according to the images cannot be performed.

Namely, motion compensation and orthogonal transform processes can be performed in units of small blocks of a variable size, whereas quantization cannot be finely controlled.

An object of the present invention is therefore to allow a fine quantization control to be performed according to the property of an image within a macroblock.

The present invention realizes finer quantization control by allowing a quantization parameter value to be changed in units of sub-blocks equal to or smaller than a macroblock in a similar manner as in motion compensation and orthogonal transform processes. Namely, even if a plurality of images having different properties coexist in a macroblock, a finer-tuned quantization control is performed, for example, by selecting fine and coarse quantization parameters respectively for corresponding sub-blocks.

According to the present invention, a finer encoding control than conventional technology can be realized by performing quantization in units of sub-blocks equal to or smaller than a macroblock.

BRIEF DESCRIPTION OF DRAWINGS

FIG. 1 is a block diagram illustrating a configuration example of functional blocks of a conventional video encoding apparatus;

FIG. 2 is a flowchart of a macroblock process executed in the conventional example;

FIG. 6 is a flowchart of a macroblock process according to the first embodiment of the present invention;

DESCRIPTION OF EMBODIMENTS

The present invention also allows a quantization parameter value to be changed in units of sub-blocks equal to or smaller than a macroblock in a similar manner as in motion compensation and orthogonal transform processes. To implement this, quantization parameter switching according to the present invention is realized by more finely setting the control units of the quantization (Q) unit 34 and the inverse quantization (IQ) unit 44 among the functional blocks illustrated in FIG. 1.

Figure 4:
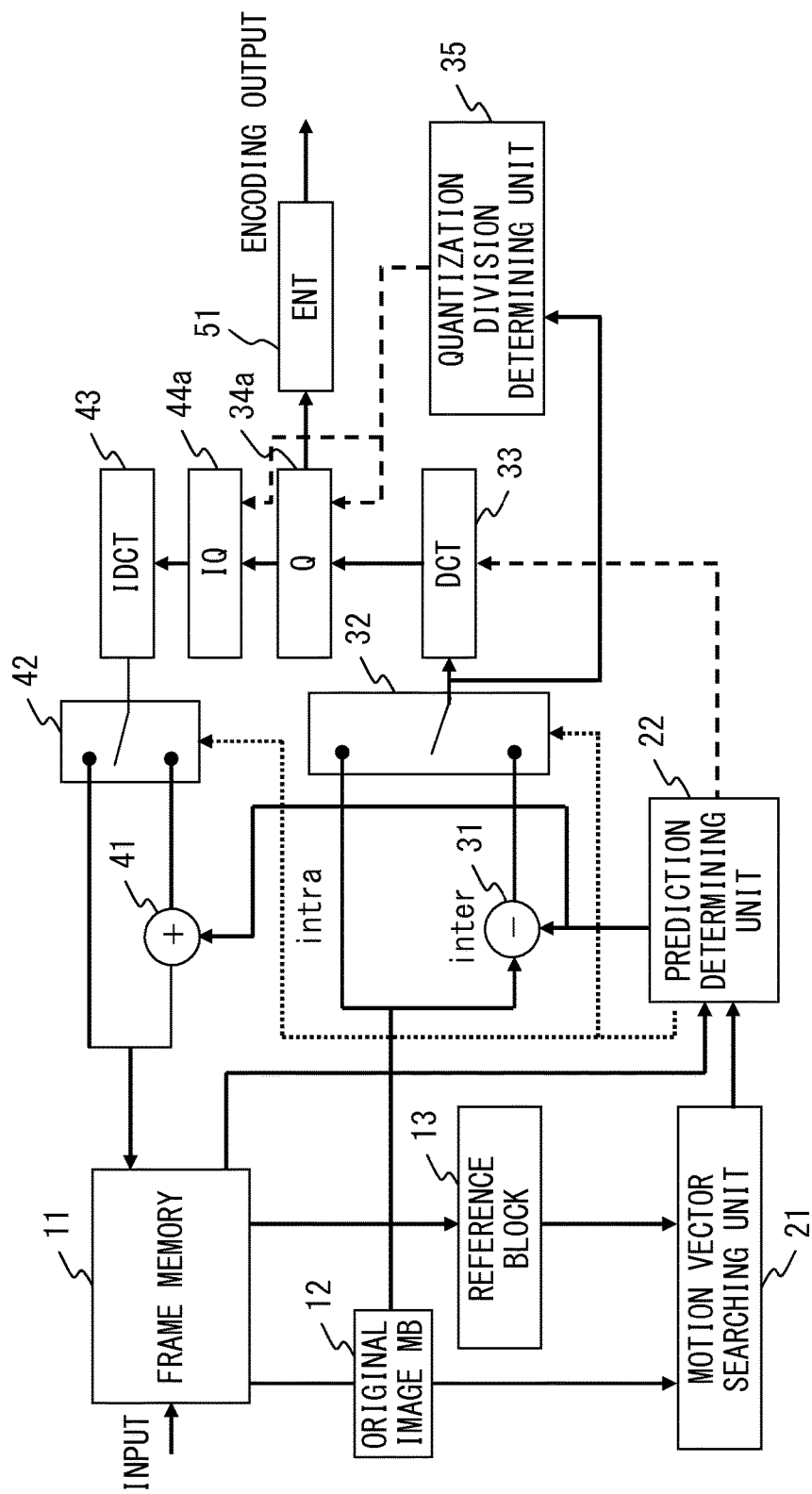
FIG. 4 is a block diagram illustrating a configuration example of functional blocks of a video encoding apparatus according to a first embodiment of the present invention.

FIG. 4 is a block diagram illustrating a configuration example of the functional blocks of a video encoding apparatus according to the first embodiment of the present invention. This figure illustrates portions related to the present invention.

Figure 3:
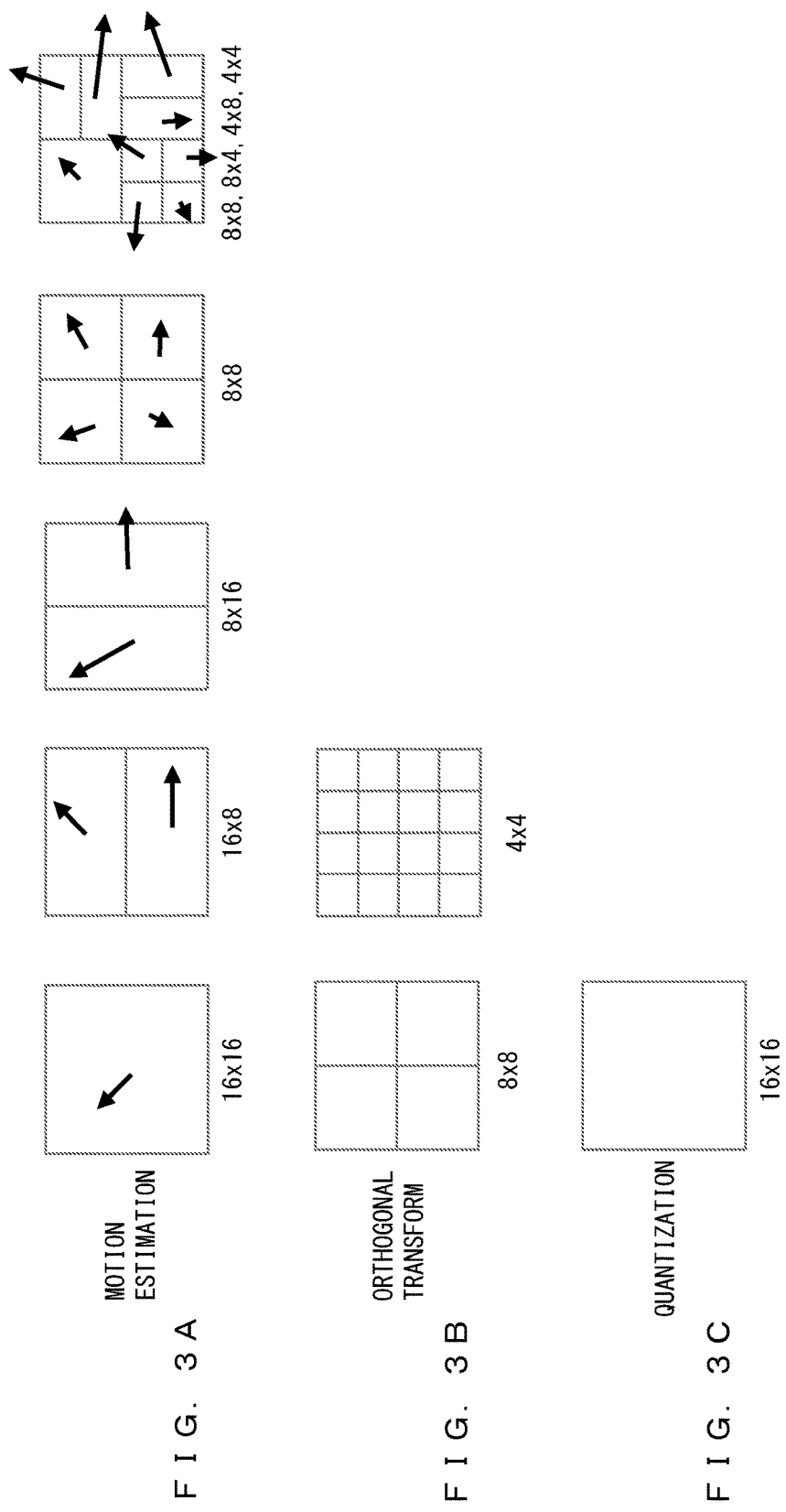
FIG. 3A is an explanatory view of dividing a macroblock in conventional motion estimation in video encoding.
FIG. 3B is an explanatory view of dividing a macroblock in a conventional orthogonal transform in video encoding.
FIG. 3C illustrates that a macroblock is not divided in conventional quantization in video encoding.

A differences from the conventional example illustrated in FIG. 3 is an addition of a quantization division determining unit 35 for determining in which units of sub-blocks a quantization parameter is set. Also the quantization (Q) unit 34a and the inverse quantization (IQ) unit 44a are modified to switch the units of sub-blocks to be processed according to quantization division information that is the output of the quantization division determining unit 35.

To the quantization division determining unit 35 illustrated in FIG. 4, pixel information in units of macroblocks is input via the first switch 32. For intra-frame prediction, an image itself of a macroblock is input from the original image macroblock buffer 12. In contrast, for inter-frame prediction, a difference image is input via the subtractor 31.

The quantization division determining unit 35 executes mode processes for the pixels of the input macroblock in predetermined units of divisions in a similar manner as in, for example, prediction evaluations that the prediction determining unit 22 makes in all the motion vector division modes, makes a prediction evaluation expressing which of the division modes is good, and outputs the result of the evaluation to the quantization (Q) unit 34a and the inverse quantization (IQ) unit 44a.

Figure 5:
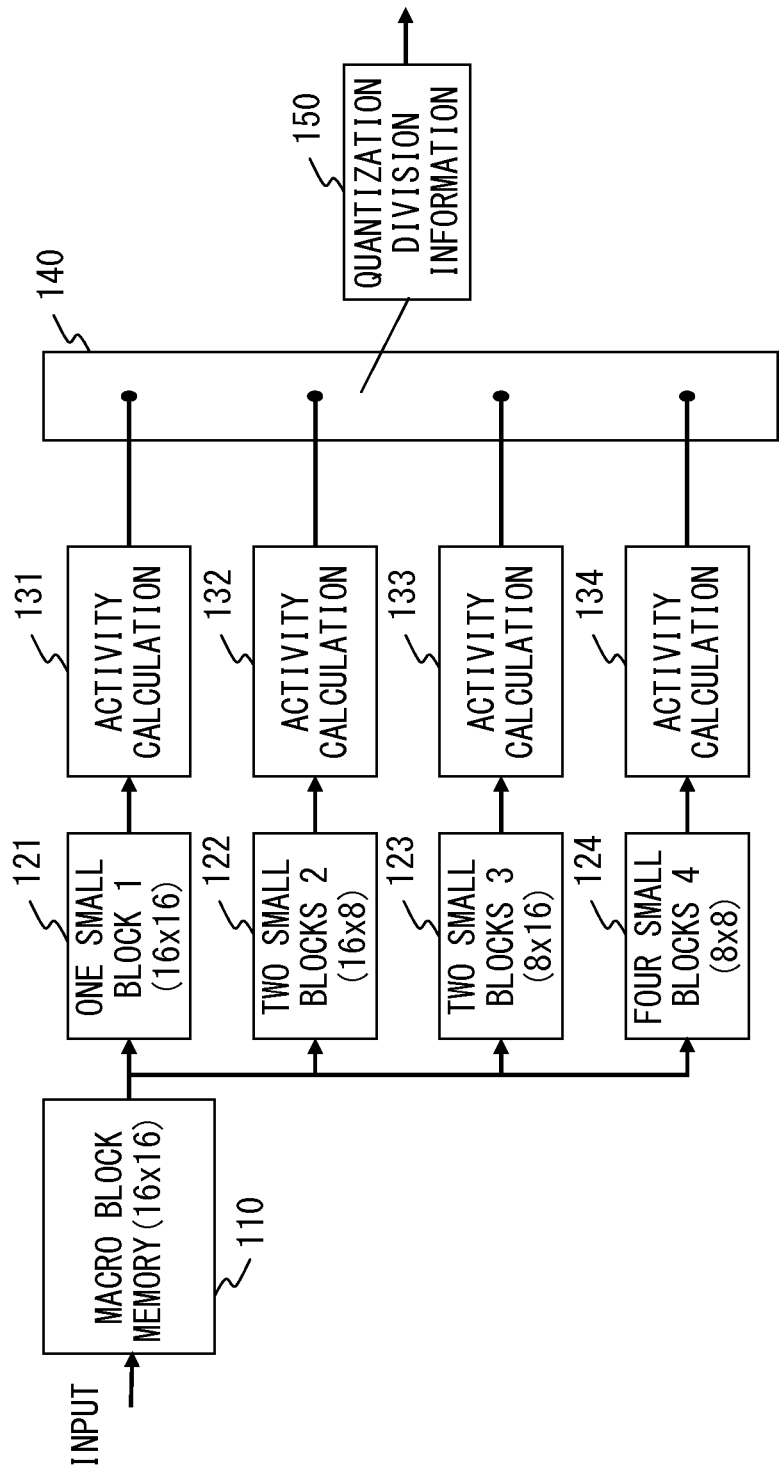
FIG. 5 is a block diagram illustrating a configuration example of functional blocks of a quantization division determining unit illustrated in FIG. 4.

FIG. 5 is a block diagram illustrating a configuration example of functional blocks of the quantization division determining unit 35 illustrated in FIG. 4.

Input pixel information in units of macroblocks is stored in the macroblock memory 110, and read into the buffers of, for example, one small block 1 (16×16) 121, two small blocks 2 (16×8) 122, two small blocks 3 (8×16) 123, and four small blocks 4 (8×8) 124 according to the division modes, and the activities of the sub-blocks are respectively calculated by their corresponding activity calculating units 131 to 134, and evaluation values of the division modes are output.

Calculation results obtained by the activity calculating units 131 to 134 are input to a quantization division deciding unit 150 via a division mode switch 140.

The quantization division deciding unit 150 decides a division mode based on the calculation results, and outputs quantization division information corresponding to the decided division mode.

The present invention is intended to perform quantization for sub-blocks, the activities of which are different, by respectively using suitable quantization parameters. If the number of divisions is simply increased, the amount of processing and the amount of encoding increase. Therefore, it is necessary to consider a balance between adaptive quantization and an increase in the amount of encoding, etc.

From an adaptive quantization viewpoint, it is desirable to divide portions having a difference in an activity as sub-blocks. An activity is associated with the degree of fineness of an image pattern. Therefore, the activity of a region of large variance of pixels is high, whereas that of a region of small variance of pixels is low. Namely, if one image region is divided into sub-blocks and if they include a sub-block of large variance of pixels and a sub-block of small variance of pixels, such a division is preferable. For example, for an image where the upper half and the lower half are respectively the blue sky and the sea with a complex wave pattern like the rough sea on the sunny day, the division of 16×8 illustrated in FIG. 3A is preferable.

Accordingly, if the variance of pixels within a sub-block is defined as the activity of the sub-block, a portion having a difference in the activity is divided as a sub-block if the division shape has a large variance of the activity of the sub-block. As a result, the evaluation of the division mode is considered to increase.

In the meantime, to achieve the balance with the amount of encoding increased by the division, it is considered to set a condition that a difference between the variance of the activity of a sub-block resultant from the division and that of the activity of a sub-block before being divided is larger than a predetermined threshold value.

In the above described image example of the rough sea on the sunny day, whether or not to further divide into sub-blocks of 8×8 depends on the balance between the advantage achieved by an increase in the variance of the activity of a sub-block and an increase in the amount of encoding as a result of the division.

Accordingly, the number of divisions is increased within a range of a defined division shape by recognizing a macroblock as the zeroth division shape, and an evaluation is made. Various methods can be possibly adopted as an evaluation method based on the above concept.

Assuming that the variance of the activity of a sub-block, which is resultant from an ith (i≥0) division, is $B(i)$, the ith division shape can be adopted if $B(i+1)-B(i)<C$ is satisfied for the threshold value C. If there are plurality of (i+1)th division shapes, it may be conditioned that the above inequality is satisfied for all the division shapes. Moreover, the threshold value C may be set as $C(i)$ and varied with the value of i.

Additionally, it may be also conditioned that $B(j)-B(i)<C$ is satisfied for all of j that satisfy j>i, not limited to the comparison with the division in the next step.

Also the following method may be adopted.

Here, define the activity $A(s)$ of a sub-block s as $$A(s)=\Sigma(\text{each pixel value}-\text{average value of pixels})^2-(\Sigma(\text{each pixel value}-\text{average value of pixels}))^2$$

The sum is assumed to be taken for the pixels within the sub-block.

Then, the variance BD(k) of the activity of the sub-block in a division shape of D(k) within a macroblock is defined as $$BD(k)=\Sigma(A(s)\text{-average value of }A(s))^2-(\Sigma(A(s)\text{-average value of }A(s)))^2$$

The sum is assumed to be taken for the sub-block in the division shape of D(k).

Furthermore, an evaluation expression H(k) of the division shape D(k) is defined as follows on the condition that .alpha. is a positive parameter.

$$H(k)=-\Sigma A(s)-\alpha*BD(k)$$

The sum is assumed to be taken for the sub-block in the division shape of D(k).

The above described evaluation expression H(k) is intended to finally select the lowest one among the activities (the values of the evaluation expression H(k)) of the division modes as a division mode of quantization by further decreasing the value of the evaluation expression H(k) if there is a big difference (namely, a sub-block having a fine drawing pattern and a sub-block having a coarse drawing pattern exist among blocks) among the activity values of divided sub-blocks.

As the number of divisions increases, the first term and the second term of H(k) increases and decreases, respectively. The value of .alpha. is a variable for adjusting the weights of these two terms, and is assumed to be a suitably adjustable value (the activity of pixels is the variance of 256 pixels of 16×16, and the activity of a sub-block is the variances of two to four sub-blocks in the example of the division shape illustrated in FIG. 4. The value of .alpha. is adjusted in consideration of these conditions, specific pixel values, etc.)

As described above, a division mode is selected in consideration of the advantages and the disadvantages provided by the divisions.

Quantization division information generated by the quantization division deciding unit 150 is passed to the quantization (Q) unit 34a as described above, and used to quantize a transform coefficient after being orthogonal-transformed in specified division units.

FIG. 6 is a flowchart of a macroblock process according to the first embodiment of the present invention.

Compared with the flow illustrated in FIG. 2, a process for obtaining motion vector information and for setting the obtained motion vector information in encoding information in steps S61 to S63 of FIG. 6 is similar to that executed in steps S21 to S23 illustrated in FIG. 2. As the initial item of encoding information, macroblock type information as motion compensation division information is set in step S61. This information includes the information indicating whether encoding is performed either with inter-frame prediction or with intra-frame prediction, and information about the division shape of a macroblock as described above. Next, motion vector information is set in step S62. Since the division shape of a macroblock varies depending on the type of the macroblock, the motion vector information is set by the number of divisions as indicated by step S63.

Next, in step S64, quantization division information generated by the quantization division determining unit 35 is set.

A process in the subsequent steps S65 and S66 is intended to obtain quantization parameters by the number of divisions in quantization, which is indicated by the quantization division information, and to set the obtained parameters in the encoding information.

In the configuration of the quantization division determining unit 35 illustrated in FIG. 5, quantization division information of any of one small block of 16×16 that is not substantially divided into small blocks, two small blocks of 16×8, two small blocks of 8×16, and four small blocks of 8×8 is selected. These division shapes are selected so that a selected division shape becomes that obtained by being further divided as the division shape in the orthogonal transform illustrated in FIG. 3B.

In the first embodiment, quantization parameters can be switched in units of sub-blocks according to the division shape of a macroblock, which is selected by the quantization division determining unit 35. Unlike the flow illustrated in FIG. 2, quantization parameters are inserted in units of sub-blocks.

Next, the flag indicating whether the orthogonal transform is performed in units of either 8×8 or 4×4 is set as orthogonal transform information in the encoding information in step S67.

Lastly, in step S68, the coefficient after being orthogonal-transformed in units of 8×8 or 4×4 is obtained, and transform coefficient information obtained by quantizing the coefficient with the quantization parameter set in step S65 is generated in units of sub-blocks, and transmitted. This process is repeated by the number of divisions as indicated by step S69. At this time, the flag cbp (coded block pattern) indicating validity/invalidity for each sub-block is set before the quantization parameter information and after the motion vector information within the encoding information. In a similar manner as in the conventional example illustrated in FIG. 2, only the valid coefficient information of a sub-block, which is indicated by the flag, is transmitted.

Additionally, since the coefficient set as the orthogonal transform information is that after being quantized, the divided quantization parameter information and the orthogonal transform information are inserted in the encoding information in this order in a similar manner as in the conventional example illustrated in FIG. 2.

The second embodiment according to the present invention is described next. The second embodiment eliminates the need for encoding quantization division information by making the division shape of a macroblock in the quantization process identical to a division shape in another encoding process. Accordingly, the amount of encoding can be prevented from increasing by the amount of encoding of the quantization division information.

Figure 7:
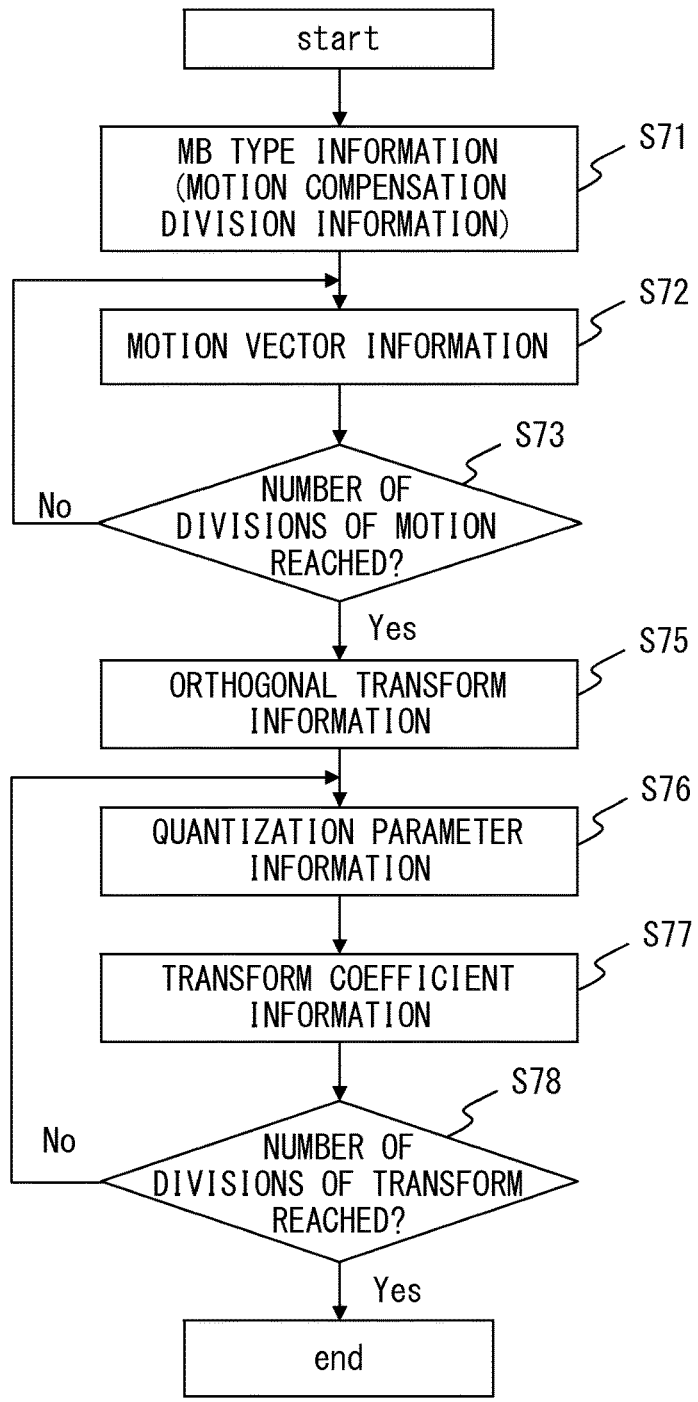
FIG. 7 is a flowchart of a macroblock process according to a second embodiment of the present invention.

FIG. 7 is a flowchart of a macroblock process in the case where the division shape of quantization is made identical to that of the orthogonal transform. Compared with the flow of the macroblock process according to the first embodiment illustrated in FIG. 6, the process for setting the quantization division information in step S65 is eliminated.

Accordingly, in the second embodiment, the quantization division determining unit 35 illustrated in FIG. 4 is not necessary. Alternatively, information about the division shape of the orthogonal transform is output from the prediction determining unit to the quantization (Q) unit 34a and the inverse quantization (IQ) unit 44a.

For example, if the size of a sub-block obtained by dividing a macroblock in the orthogonal transform is 8×8, also the size of a sub-block obtained by dividing a macroblock in the quantization process is 8×8.

A process for obtaining motion vector information and for setting the obtained information in the encoding information in steps S71 to S73 is similar to the process in steps S21 to S23 of FIG. 2, and the process in steps S61 to S63 of FIG. 6.

Next, the flag indicating whether the orthogonal transform is performed in units of either 8×8 or 4×4 is set as orthogonal transform information in the encoding information in step S75.

Then, quantization parameter information is set for each sub-block according to the division shape set in step S75 in step S76, and the coefficient information of the orthogonal transform, which is quantized with the set quantization parameter information, is obtained and set in the video encoding information in step S77.

As indicated by steps S78, steps S76 and S77 are repeated by the number of divisions of sub-blocks in the orthogonal transform.

The process illustrated in FIG. 7 is described by assuming that the division shape in the quantization is made identical to that in the orthogonal transform. However, a division shape in motion compensation and that in the quantization maybe made identical as an alternative to the division shape in the orthogonal transform. In this case, the quantization parameter information is set for each sub-block according to the division shape set in step S71 in step S76. In step S77, the coefficient information in the orthogonal transform, which is quantized with the set quantization parameter information, is obtained and set in the video encoding information. However, the division shape in the motion compensation, namely, the division shape in the quantization must be divisions into sub-blocks of a size equal to or larger than that of a sub-block in the orthogonal transform in this case. This is because if the division shape in the quantization is fine, also the orthogonal transform process must be executed according to this division shape.

A third embodiment is described next. The third embodiment relates to the encoding of a quantization parameter, and can be implemented simultaneously with the above described first or second embodiment.

Conventional quantization is performed in units of macroblocks, and an encoding method of a quantization parameter is intended to encode a difference between the quantization parameter values of the current macroblock and a macroblock positioned at the left of the current macroblock.

The present invention allows quantization to be performed in units of sub-blocks. Therefore, in the third embodiment, a difference between quantization parameter values is encoded with reference to a plurality of neighboring sub-blocks, and the amount of encoding of quantization parameter information is further reduced.

Figure 8A:
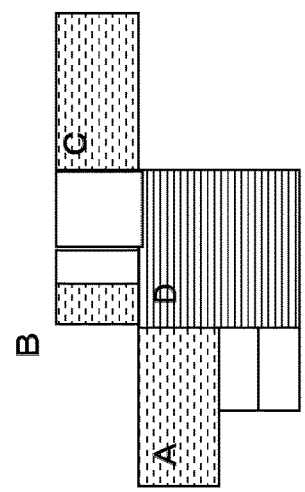
FIG. 8A is an explanatory view of a third embodiment according to the present invention.
Figure 8B:
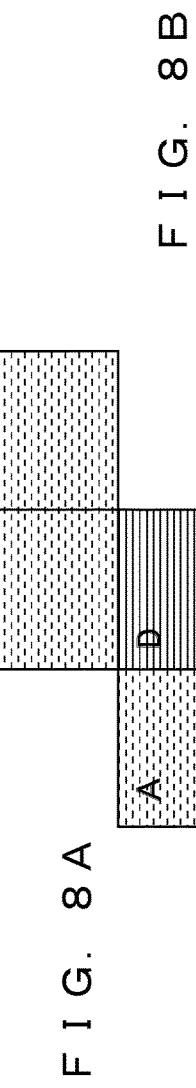
FIG. 8B is an explanatory view of the third embodiment according to the present invention.
Figure 8C:
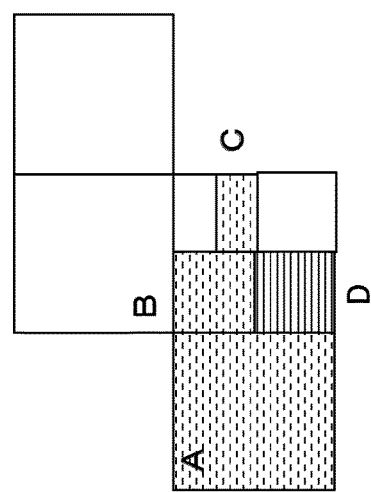
FIG. 8C is an explanatory view of the third embodiment according to the present invention.

FIGS. 8A to 8C are explanatory views of the third embodiment. These figures illustrate a sub-block currently being encoded and neighboring sub-blocks to be referenced. In FIGS. 8A to 8C, a macroblock or a sub-block D, which is depicted with solid lines, is the block currently being encoded, and macroblocks or sub-blocks B, C and D, which are depicted with dotted lines, are the neighboring blocks to be referenced.

For example, for a motion vector, the intermediate value of motion vectors of the left macroblock (A), the upper macroblock (B) and the upper right macroblock (C), which are illustrated in FIG. 8A, is recognized as a predicted vector of the current macroblock, and a difference from the predicted vector is encoded. Similarly, even when quantization is performed in units of sub-blocks, the amount of information of the quantization parameter value of the macroblock D can be reduced by calculating the intermediate value of the quantization parameter values of the left macroblock (A), the upper macroblock (B) and the upper right macroblock (C), and by encoding a difference from the intermediate value.

FIG. 8B illustrates that the current macroblock D is encoded by referencing the quantization parameter values of a sub-block A of the left macroblock, a sub-block B of the upper macroblock, and a sub-block C of the upper right macroblock. FIG. 8C illustrates that the current sub-block D of the current macroblock is encoded by referencing the quantization parameter values of the left macroblock A, an upper sub-block B of the current macroblock and an upper right sub-block C of the current macroblock.

As illustrated in FIGS. 8B and 8C, a plurality of sub-blocks sometimes contact at the positions of the left macroblock, the upper macroblock, and the upper right macroblock. In such a case, it is predefined, for example, that a further upper sub-block, a further left sub-block, and a further lower left sub-block are selected respectively as the left sub-block A, the upper sub-block B and the upper right sub-block C in a similar manner as in the prediction of a motion vector.

As described above in detail, according to the present invention, favorable video encoding can be realized. Moreover, the present invention was devised to minimize the amount of encoding, which is required for a quantization information transmission and can be possibly increased by changing quantization parameters in finer units.

Video decoding corresponding to the video encoding method according to the present invention is described last.

Figure 9:
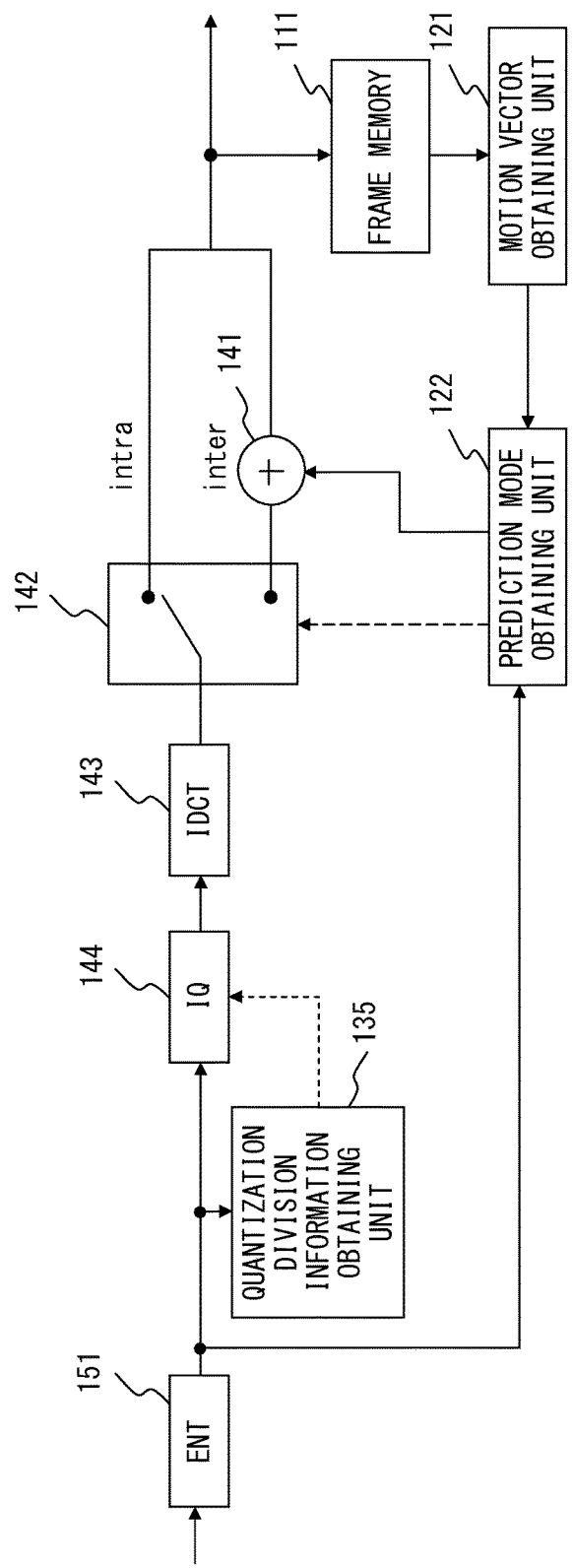
FIG. 9 is a block diagram illustrating a configuration example of functional blocks of a video decoding apparatus corresponding to the video encoding apparatus according to the present invention.

FIG. 9 is a block diagram illustrating a configuration example of functional blocks of a video decoding apparatus corresponding to the video encoding apparatus according to the present invention. This figure illustrates only portions related to the present invention. A process of the video decoding apparatus is almost similar to the image restoration process in and after the inverse quantization in the video encoding apparatus.

For example, an encoding output from the video encoding apparatus illustrated in FIG. 4 is input to a variable-length decoder (ENT) 151 via a storage medium or a communication medium. The variable-length decoder (ENT) 151 corresponds to the variable-length encoding (ENT) unit 51 illustrated in FIGS. 1 and 4. This decoder performs an inverse transform for arithmetic information compression performed by the variable-length encoding (ENT) unit 51, and decodes data before the arithmetic information compression, namely, data after being quantized, etc.

A quantization division information obtaining unit 135 obtains quantization division information set by the quantization division determining unit 35 illustrated in FIG. 4 from the data after being decoded, and controls the inverse quantization process of the inverse quantization (IQ) unit 144. As stated earlier, the quantization division information indicates the division shape of a macroblock, in which quantization parameters can be switched in units of sub-blocks. Therefore, the inverse quantization (IQ) unit 144 performs inverse quantization for an orthogonal transform coefficient that is quantized in units of sub-blocks according to the instructed division shape in a macroblock to be processed, and obtains the original orthogonal transform coefficient.

The inverse orthogonal transform (IDCT) unit 143 restores data before being orthogonal-transformed from the orthogonal transform coefficient with an inverse orthogonal transform.

In the meantime, decoded data of the variable-length decoder (ENT) 151 is provided to a prediction mode obtaining unit 122.

The prediction mode obtaining unit 122 obtains, from the decoded data, information indicating whether the prediction mode selected by the prediction determining unit 22 illustrated in FIG. 4 is either inter-frame prediction or intra-frame prediction, and switches a switch 142 to an intra side or an inter side according to the information.

In the case of the intra-frame prediction mode, the output of the inverse orthogonal transform (IDCT) unit 143 is output as a restored image, and stored in the frame memory 111 in order to be used to restore an image in the inter-frame prediction mode.

In the case of the inter-frame prediction mode, the output of the inverse orthogonal transform (IDCT) unit 143 is difference data. Base image data of the difference data is read from the frame memory 111, and motion vector information obtained by the motion vector obtaining unit 121 is added to the image data, which is then provided from the prediction mode obtaining unit 122 to an adder 141. The adder 141 generates a restored image by adding the difference data that is the output of the inverse orthogonal transform (IDCT) unit 143 to the image data from the prediction mode obtaining unit 122.

The video decoder illustrated in FIG. 9 is described by being assumed to correspond to the video encoding apparatus according to the first embodiment. However, it is evident that this decoder can also correspond to the video encoding apparatus according to the second embodiment by obtaining macroblock type information or orthogonal transform information in the quantization division information obtaining unit 135. Accordingly, it is also evident that the configuration example of the functional blocks of the video decoder illustrated in FIG. 9 is not limited to that according to the first embodiment.

```
macroblock_layer( ) {
    mb_type
        if( mb_type == I_PCM ) {
            while( !byte_aligned( ) )
} else {
    pcm_alignment_zero_bit
for( i = 0; i < 256; i++ )
    pcm_sample_luma[ i ]
for( i = 0; i < 2 * MbWidthC * MbHeightC; i++ )
    pcm_sample_chroma[ i ]
noSubMbPartSizeLessThan8x8Flag = 1 if( mb_type != I_NxN &&
    MbPartPredMode( mb_type, 0 ) != Intra_16x16 && NumMbPart( mb_type ) = = 4) {
    sub_mb_pred( mb_type)
    for( mbPartIdx = 0; mbPartIdx < 4; mbPartIdx++ )
        if( sub_mb_type[ mbPartIdx ] != B_Direct_8x8 ) {
            if( NumSubMbPart( sub_mb_type[ mbPartIdx ] )
> 1 )
noSubMbPartSizeLessThan8x8Flag = 0
            } else if( !direct_8x8_inference_flag )
} else {
noSubMbPartSizeLessThan8x8Flag = 0
                if( transform_8x8_mode_flag && mb_type == I_NxN )
                    transform_size_8x8_flag
                mb_pred( mb_type )
            }
            if( MbPartPredMode( mb_type, 0) != Intra_16x16 ) {
                coded_block_pattern
                    if( CodedBlockPatternLuma > 0 && transform_8x8_mode_flag
                    && mb_type != I_NxN && noSubMbPartSizeLessThan8x8Flag
                    &&
                    ( mb_type !=B_Direct_16x16 || direct_8x8_inference_flag ) )
                        transform_size_8x8_flag
            }
                if( CodedBlockPatternLuma > 0 || CodedBlockPatternChroma > 0 ||
                MbPartPredMode( mb_type, 0 ) = = Intra_16x16 ) {
                    mb_qp_delta
                    residual( )
                }
            }
        }
    }
    mb_pred( mb_type) {
        if( MbPartPredMode( mb_type, 0 ) = = Intra_4x4 ||
        MbPartPredMode( mb_type, 0 ) = = Intra_8x8 ||
        MbPartPredMode( mb_type, 0 ) = = Intra_16x16 ) { if(
        MbPartPredMode( mb_type, 0 ) = = Intra_4x4 )
            for( luma4x4BlkIdx=0; luma4x4BlkIdx<16; luma4x4BlkIdx++ ) {
                prev_intra4x4_pred_mode_flag[ luma4x4BlkIdx ]
                if( !prev_intra4x4_pred_mode_flag[ luma4x4BlkIdx ] )
                    rem_intra4x4_pred_mode[ luma4x4BlkIdx ]
            }
            if( MbPartPredMode( mb_type, 0) = = Intra_8x8 )
                for( luma8x8BlkIdx=0; luma8x8BlkIdx<4; luma8x8BlkIdx++ ) {
                    prev_intra8x8_pred_mode_flag[ luma8x8BlkIdx ]
                    if( !prev_intra8x8_pred_mode_flag[ luma8x8BlkIdx ] )
                        rem_intra8x8_pred_mode[ luma8x8BlkIdx ]
                }
            if( chroma_format_idc != 0 )
                intra_chroma_pred_mode
```

```
        } else if( MbPartPredMode( mb_type, 0 ) != Direct ) {
                for( mbPartIdx = 0; mbPartIdx < NumMbPart( mb_type ); mbPartIdx++)
                        if( ( num_ref_idx_l0_active_minus1 > 0 ||
                                mb_field_decoding_flag ) &&
                                MbPartPredMode( mb_type, mbPartIdx ) != Pred_L1 )
                                        ref_idx_l0[ mbPartIdx ]
                        for( mbPartIdx = 0; mbPartIdx < NumMbPart( mb_type ); mbPartIdx++)
                                if( ( num_ref_idx_l1_active_minus1 > 0 ||
                                        mb_field_decoding_flag ) &&
                                        MbPartPredMode( mb_type, mbPartIdx ) != Pred_L0 )
                                                ref_idx_l1[ mbPartIdx ]
                        for( mbPartIdx = 0; mbPartIdx < NumMbPart( mb_type ); mbPartIdx++)
                                if( MbPartPredMode ( mb_type, mbPartIdx ) != Pred_L1 )
                                        for( compIdx = 0; compIdx < 2; compIdx++ )
                                                mvd_l0[ mbPartIdx ][ 0 ][ compIdx ]
                        for( mbPartIdx = 0; mbPartIdx < NumMbPart( mb_type ); mbPartIdx++)
                                if( MbPartPredMode( mb_type, mbPartIdx ) != Pred_L0 )
                                        for( compIdx = 0; compIdx < 2; compIdx++ )
                                                mvd_l1[ mbPartIdx ][ 0 ][ compIdx ]
        }
}
sub_mb_pred( mb_type) {
        for( mbPartIdx = 0; mbPartIdx < 4; mbPartIdx++ )
                sub_mb_type[ mbPartIdx ]
        for( mbPartIdx = 0; mbPartIdx < 4; mbPartIdx++ )
                if( ( num_ref_idx_l0_active_minus1 > 0 || mb_field_decoding_flag ) &&
                        mb_type != P_8x8ref0 &&
                        sub_mb_type[ mbPartIdx ] != B_Direct_8x8 && SubMbPredMode(
                        sub_mb_type[ mbPartIdx ] ) != Pred_L1 ) ref_idx_l0[ mbPartIdx ]
        for( mbPartIdx = 0; mbPartIdx < 4; mbPartIdx++ )
                if( (num_ref_idx_l1_active_minus1 > 0 || mb_field_decoding_flag ) &&
                        sub_mb_type[ mbPartIdx ] != B_Direct_8x8 && SubMbPredMode(
                        sub_mb_type[ mbPartIdx ] ) != Pred_L0 ) ref_idx_l1[ mbPartIdx ]
        for( mbPartIdx = 0; mbPartIdx < 4; mbPartIdx++ )
                if( sub_mb_type[ mbPartIdx ] != B_Direct_8x8 &&
                        SubMbPredMode( sub_mb_type[ mbPartIdx ] ) != Pred_L1 )
                        for( subMbPartIdx = 0;
                        subMbPartIdx < NumSubMbPart( sub_mb_type[ mbPartIdx ] );
                        subMbPartIdx++)
                                for( compIdx = 0; compIdx < 2; compIdx++ )
                                        mvd_l0[ mbPartIdx ][ subMbPartIdx ][ compIdx ]
        for( mbPartIdx = 0; mbPartIdx < 4; mbPartIdx++ )
                if( sub_mb_type[ mbPartIdx ] != B_Direct_8x8 &&
                        SubMbPredMode( sub_mb_type[ mbPartIdx ] ) != Pred_L0 )
                        for( subMbPartIdx = 0;
                        subMbPartIdx < NumSubMbPart( sub_mb_type[ mbPartIdx ] );
                        subMbPartIdx++)
}
residual( ) {
for( compIdx = 0; compIdx < 2; compIdx++ )
        mvd_l1[ mbPartIdx ][ subMbPartIdx ][ compIdx ]
        if( !entropy_coding_mode_flag )
else
residual_block = residual_block_cavlc
        residual_block = residual_block_cabac
        if( MbPartPredMode( mb_type, 0 ) = = Intra_16x16 )
                residual_block( Intra16x16DCLevel, 16 )
        for( i8x8 = 0; i8x8 < 4; i8x8++ ) /* each luma 8x8 block */
                if( !transform_size_8x8_flag || !entropy_coding_mode_flag )
                        for( i4x4 = 0; i4x4 < 4; i4x4++ ) { /* each 4x4 sub-block of block */
                        if( CodedBlockPatternLuma & ( 1 <<i8x8 ) )
                                if( MbPartPredMode( mb_type, 0 ) = =
                        Intra_16x16 )
                                        residual_block( Intra16x16ACLevel[ i8x8
                                        * 4 + i4x4 ], 15 )
                                else
                                        residual_block( LumaLevel[ i8x8 * 4 +
                                        i4x4 ], 16 )
                        else if( MbPartPredMode( mb_type, 0 ) = = Intra_16x16 )
                                for( i = 0; i < 15; i++ )
                                        Intra16x16ACLevel[ i8x8 * 4 +
                                        i4x4 ][ i ] = 0
else
for( i = 0; i < 16; i++ )
                                                LumaLevel[ i8x8 * 4 + i4x4 ][ i ] = 0 if(
                                        !entropy_coding_mode_flag &&
                                transform_size_8x8_flag )
                                        for( i = 0; i < 16; i++ ) LumaLevel8x8[
                                i8x8 ][ 4 * i + i4x4 ] =
```

```
                                LumaLevel[ i8x8 * 4 + i4x4 ][ i ]
                        }
                else if( CodedBlockPatternLuma & ( 1 << i8x8 ) )
                        residual_block( LumaLevel8x8[ i8x8 ], 64 )
else
for( i = 0; i < 64; i++ )
    LumaLevel8x8[ i8x8 ][ i ] = 0
        if( chroma_format_idc != 0) {
                NumC8x8 = 4/ ( SubWidthC * SubHeightC )
                for( iCbCr = 0; iCbCr < 2; iCbCr++ )
present */
if( CodedBlockPatternChroma & 3 ) /* chroma DC residual
                                residual_block( ChromaDCLevel[ iCbCr ], 4 *
                        NumC8x8 )
                        else
                                for( i = 0; i < 4 * NumC8x8; i++ )
                                        ChromaDCLevel[ iCbCr ][ i ] = 0
                for( iCbCr = 0; iCbCr < 2; iCbCr++ )
                        for( i8x8 = 0; i8x8 < NumC8x8; i8x8++ )
                                for( i4x4 = 0; i4x4 < 4; i4x4++ )
                                        if( CodedBlockPatternChroma & 2 )
                                                /* chroma AC residual present */
                                                residual_block( ChromaACLevel[ iCbCr ] [
                                        i8x8*4+i4x4 ], 15)
                                        else
                                                for( i = 0; i < 15; i++ )
                                                        ChromaACLevel[ iCbCr ][ i8x8*4
                                                +i4x4 ][ i ] = 0
}
residual_block_cavlc( coeffLevel, maxNumCoeff ) {
        for( i = 0; i < maxNumCoeff; i++ )
                coeffLevel[ i ] = 0
        coeff_token
        if( TotalCoeff( coeff token ) > 0) {
                if( TotalCoeff( coeff token ) > 10 && TrailingOnes( coeff token ) < 3 )
else
suffixLength = 1
                suffixLength = 0
        for( i = 0; i < TotalCoeff( coeff_token ); i++ )
                if( i < TrailingOnes( coeff_token ) ) {
} else {
trailing_ones_sign_flag
level[ i ] = 1 – 2 * trailing_ones_sign_flag
                        level_prefix
                        levelCode = ( Min( 15, level_prefix ) << suffixLength )
                        if( suffixLength > 0 || level_prefix >= 14) {
                                level_suffix
                                levelCode += level_suffix
                        }
                        if( level_prefix >= 15 && suffixLength = = 0 )
                                levelCode += 15 if(
                        level_prefix >= 16 )
                                levelCode += ( 1 << ( level_prefix – 3 ) ) – 4096 if( i = =
                        TrailingOnes( coeff token ) &&
                                TrailingOnes( coeff token ) < 3 )
                                levelCode += 2 if(
                        levelCode % 2 = = 0)
                                level[ i ] = ( levelCode + 2 ) >> 1 else
                                level[ i ] = ( –levelCode – 1 ) >> 1 if(
                        suffixLength = = 0 )
                                suffixLength = 1
                        if( Abs( level[ i ] ) > ( 3 << ( suffixLength – 1 ) ) &&
                                suffixLength < 6 )
                                suffixLength++
                }
                if( TotalCoeff( coeff token ) < maxNumCoeff ) {
                        total_zeros
                        zerosLeft = total_zeros
                } else
                        zerosLeft = 0
                for( i = 0; i < TotalCoeff( coeff token ) – 1; i++ ) {
                        if( zerosLeft > 0) {
                        run_before
                        run[ i ] = run_before
                } else
                        run[ i ] = 0
                zerosLeft = zerosLeft – run[ i ]
        }
        run[ TotalCoeff( coeff_token ) – 1 ] = zerosLeft coeffNum
```

```
            = -1
        for( i = TotalCoeff( coeff_token ) - 1; i >= 0; i-- ) {
            coeffNum += run[ i ] + 1 coeffLevel[
            coeffNum ]= level[ i ]
            }
        }
    }
    residual_block_cabac( coeffLevel, maxNumCoeff ) {
        if( maxNumCoeff = = 64)
            coded_block_flag = 1 else
            coded_block_flag
        if( coded_block_flag ) {
            numCoeff = maxNumCoeff i = 0
    do {
    significant_coeff_flag[ i ]
    if( significant_coeff flag[ i ] ) {
                last_significant_coeff_flag[ i ]
                if( last_significant_coeff_flag[ i ] ) {
                    numCoeff = i + 1
                    for( j = numCoeff; j < maxNumCoeff; j++ )
                        coeffLevel[ j ] = 0
                }
            }
            i++
        } while( i < numCoeff - 1) coeff_abs_level_minus1[
        numCoeff - 1] coeff_sign_flag[ numCoeff - 1 ] coeffLevel[
        numCoeff - 1] =
            ( coeff_abs_level_minus1[ numCoeff - 1] + 1) * ( 1 - 2 *
            coeff_sign_flag[ numCoeff - 1 ] )
        for( i = numCoeff - 2; i >= 0; i-- )
                if( significant_coeff_flag[ i ] ) {
                    coeff_abs_level_minus1[ i ] coeff_sign_flag[
                    i ]
                            coeffLevel[ i ] = ( coeff_abs_level_minus1[ i ] + 1
                            ) * ( 1 - 2 * coeff_sign_flag[ i ] )
            } else
    } else
    coeffLevel[ i ] =0
        for( i = 0; i < maxNumCoeff; i++ )
            coeffLevel[ i ] = 0
    }
```

The invention claimed is:

1. A video decoding method for decoding a video encoded by a video encoding apparatus, the video decoding method comprising:

obtaining quantization division information set in video encoding information; and performing inverse quantization for an orthogonal transform coefficient quantized for each of sub-blocks according to the obtained quantization division information in a block of a predetermined size to be processed, wherein the video encoding information has been generated by the video encoding apparatus by dividing each frame of a video into blocks of the predetermined size and by encoding blocks using a quantization parameter defined corresponding to the blocks of the predetermined size, wherein the video encoding apparatus configured to compress information of image data in a spatial direction and to quantize the orthogonal transform coefficient of the image data that is orthogonal-transformed, wherein the video encoding apparatus divides the blocks of the predetermined size into sub-blocks based on the quantization division information for dividing the blocks of the predetermined size into the sub-blocks of a size smaller than the predetermined size, each of which is quantized by using the quantization parameter according to an image property, quantizes the orthogonal transform coefficient by using a quantization parameter decided for each of the sub-blocks, and encodes the decided quantization parameter for each of the sub-blocks, each of the sub-blocks for which the quantization parameter is decided has a size equal to or larger than a block size that is a unit of processing in the orthogonal transform, the video encoding apparatus quantizes a difference of a quantization parameter, which is used to quantize the orthogonal transform coefficient, from a quantization parameter among quantization parameters of encoded neighboring blocks of the predetermined size or sub-blocks, the quantization parameter is an intermediate value of the quantization parameters of the encoded neighboring blocks of the predetermined size or sub-blocks, when a plurality of left blocks that are adjacent to a left end of the sub-block to be encoded are present and a plurality of upper blocks that are adjacent to an upper end of the sub-block to be encoded are present as an encoded block of the predetermined size or an encoded sub-block, a difference between an intermediate value between a quantization parameter of further upper block among the left blocks and a quantization parameter of further left block among the upper blocks, and a quantization parameter the sub-block to be encoded is encoded.

* * * * *